(12) United States Patent
Chen

(10) Patent No.: US 7,516,319 B2
(45) Date of Patent: Apr. 7, 2009

(54) METHOD FOR BOOTING A COMPUTER WITH SECOND OS INVOLVES FORMATTING PORTION OF MAIN MEMORY WITH A SECOND FILE SYSTEM TO GENERATE RAMDISK

(75) Inventor: Chiu-Fu Chen, Taipei (TW)

(73) Assignee: Mitac Technology Corp., Hsinchu (TW)

( * ) Notice: Subject to any disclaimer, the term of this patent is extended or adjusted under 35 U.S.C. 154(b) by 392 days.

(21) Appl. No.: 11/100,018

(22) Filed: Apr. 5, 2005

(65) Prior Publication Data

US 2006/0101259 A1    May 11, 2006

(30) Foreign Application Priority Data

Nov. 5, 2004    (TW)    ............... 93133831 A

(51) Int. Cl.
  *G06F 15/177*    (2006.01)
(52) U.S. Cl. ............................ 713/2; 713/1
(58) Field of Classification Search ............ 713/1, 713/2, 100
  See application file for complete search history.

(56) References Cited

U.S. PATENT DOCUMENTS

| 7,430,661 | B2 * | 9/2008 | Dunn et al. | 713/2 |
| 2003/0012114 | A1 * | 1/2003 | Larvoire et al. | 369/100 |
| 2003/0188144 | A1 * | 10/2003 | Du et al. | 713/1 |
| 2004/0073783 | A1 * | 4/2004 | Ritchie | 713/1 |
| 2006/0123201 | A1 * | 6/2006 | Wu | 711/147 |

FOREIGN PATENT DOCUMENTS

CN    1673962 A    9/2005

OTHER PUBLICATIONS

O'Reilly & Associates, Running Linux, 2001, Third edition, pp. 1, 5, and 6; sections D.3., D.3.2., and D.3.3.*
Installing Ubuntu Linux on the Beige G3 Mac, pp. 1-3.*
Forselius, Mikael, Penguin—Howto, Mar. 13, 1998, pp. 1-3.*
Bootx Bootloader, Sep. 25, 2004, pp. 1-3.*
Laganiere, Jean, A Ready to Execute ISO CD-Rom Distribution—Rxlinux 1.3.0—A Linux Diskless CD-Rom, Feb. 5th, 2003, p. 11.*
Nidek, Mike, How to Install Linuxppc on a G3 Powerbook, Oct. 29, 1998, pp. 1-3.*
BaiscLinux 1.8, Dec. 31, 2002, http://www.volny.cz/basiclinux1/baslin18.zip.*
Xlife, "Booting with Loadlin", Dec. 10, 2001, http://old.xlife.zuavra.net/columns/20011210/#using.*

(Continued)

*Primary Examiner*—Chun Cao
(74) *Attorney, Agent, or Firm*—Quintero Law Office

(57) ABSTRACT

A boot method is implemented in a computer comprising a main memory and a storage device. A partition of the storage device comprises a first operating system and a second operating system. The partition is formatted with a first file system compatible with the first operating system. The second operating system comprises a kernel and is compatible with a second file system. When the computer boots up with the second operating system, the kernel is loaded from the partition to the main memory. A portion of the main memory is formatted with the second file system to serve as a ramdisk. The second operating system is loaded from the partition to the ramdisk.

9 Claims, 5 Drawing Sheets

OTHER PUBLICATIONS

BasicLinux, Dec. 31, 2002, http://www.volny.cz/basiclinux1/.*
BasicLinux FAQ, Dec. 31, 2002, http://www.volny.cz/basiclinux1/faq.txt.*
BasicLinux, Mar. 14, 2003, http://ask.slashdot.org/article.pl?sid=03/03/14/0729223&mode=thread&tid=190.*
"A shortcut to Set up Multi-Operating System", China Academic Journal Electronic Pulishing House, 2005, 2 pages, vol. 4, China.
Mark Nielsen, "How to use a Ramdisk for Linux", http://fangiang.chinaunix.net/system/linux/2001-05-01/243.shtml, 8 pages, May 1, 2001, US.

* cited by examiner

METHOD FOR BOOTING A COMPUTER WITH SECOND OS INVOLVES FORMATTING PORTION OF MAIN MEMORY WITH A SECOND FILE SYSTEM TO GENERATE RAMDISK

BACKGROUND

The invention relates to computer techniques, and in particular, to boot methods and computers utilizing the same.

Computers can serve as information appliances, such as TVs or Digital Versatile Disc (DVD) players, providing multimedia playing functions utilizing Microsoft Windows. It is time consuming, however, to boot up and shut down a computer before and after playing multimedia.

In a conventional solution to this problem, another operating system (OS) requiring less boot time is installed in another partition. A hard disk typically supports four partitions. Different operating systems typically supporting different file systems must be installed in different partitions. Thus, installation of the other OS occupies at least one partition.

Additionally, different from installation of general applications, installation of an additional OS requires rebooting a target computer with a boot disk, which is also inconvenient.

SUMMARY

Accordingly, boot methods and computers utilizing the same are provided. An exemplary embodiment of the boot method is implemented in a computer comprising a main memory and a storage device. A partition of the storage device comprises a first operating system and a second operating system. The partition is formatted with a first file system compatible with the first operating system. The second operating system comprises a kernel and is compatible with a second file system. When the computer boots up with the second operating system, the kernel is loaded from the partition to the main memory. A portion of the main memory is formatted with the second file system to serve as a ramdisk. The second operating system is loaded from the partition to the ramdisk.

An exemplary embodiment of a computer-readable storage medium implementing a boot method is also provided. The storage medium storing a computer program which, when executed, directs a computer to perform the boot method. The computer comprises a main memory and a storage device, a partition of which comprises a first operating system. The partition is formatted with a first file system compatible with the first operating system. After the computer boots up with the first operating system, an installation program of a second operating system is executed utilizing the first operating system. The second operating system comprises a kernel and is compatible with another second file system. The second operating system stored in the partition conforming to the first file system utilizing the installation program. A loader is stored in the storage device utilizing the installation program. The loader loads the kernel to the main memory when the computer boots up. When loaded to the main memory, the kernel formats a portion of the main memory with the second file system to be a ramdisk and loads the second operating system from the partition to the ramdisk.

An exemplary embodiment of a computer comprises a main memory, a storage device, and a processor. A partition of the storage device comprises a first operating system and a second operating system. The partition is formatted with a first file system compatible with the first operating system. The second operating system comprises a kernel and is compatible with another second file system. The processor is coupled to the main memory and the storage device, when the computer boots up with the second operating system, loads the kernel from the partition to the main memory, formats a portion of the main memory with the second file system to serve as a ramdisk, and loads the second operating system from the partition to the ramdisk.

DESCRIPTION OF THE DRAWINGS

The invention can be more fully understood by reading the subsequent detailed description and examples with references made to the accompanying drawings, wherein.

DETAILED DESCRIPTION

Boot methods and computers utilizing same are provided, whereby two different OSs are selectively loaded to boot a computer without requiring two partitions.

Figure 1:
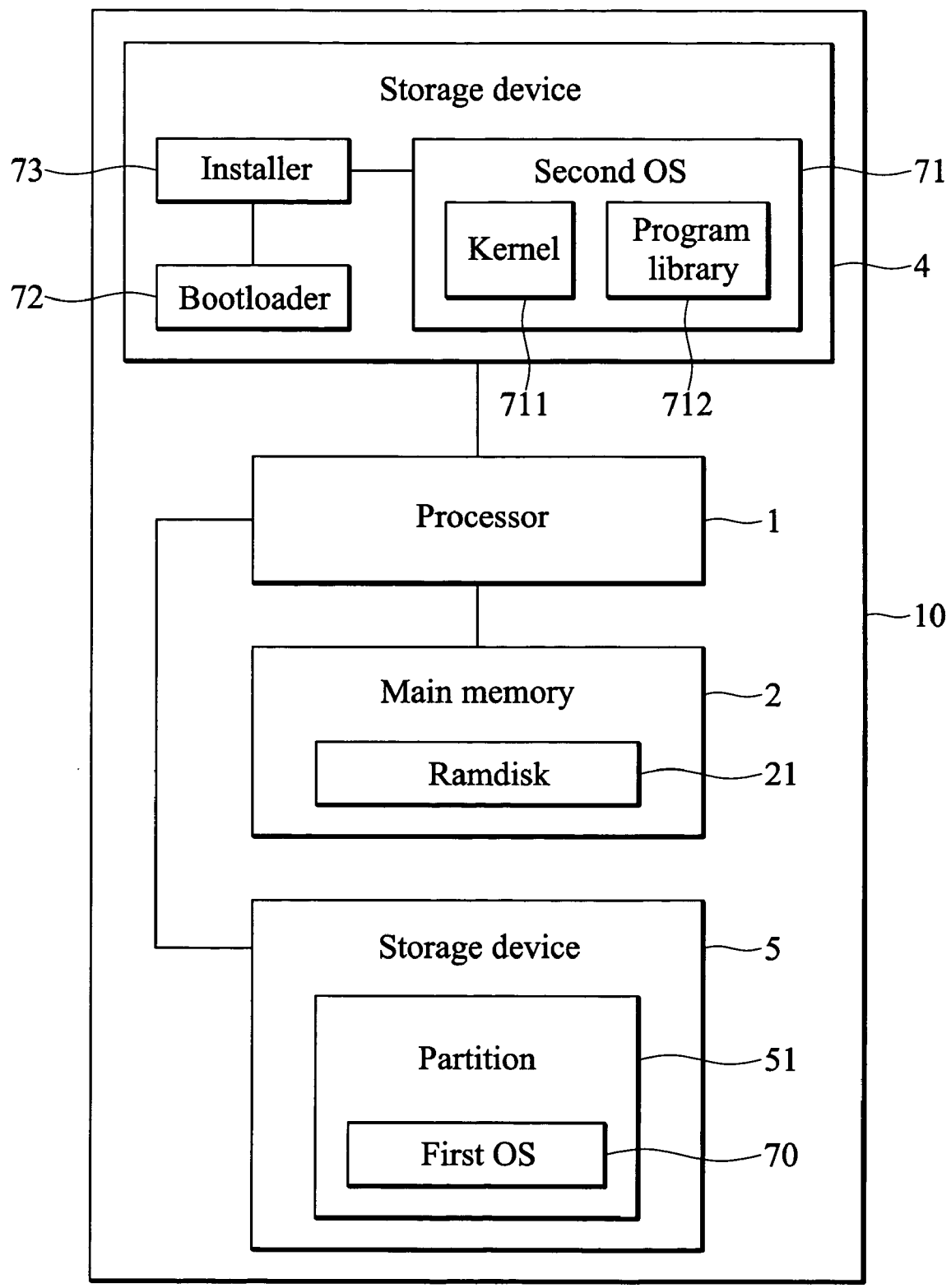
FIG. 1 is a block diagram of the configuration of an exemplary embodiment of a computer.

In FIG. 1, processor 1 is coupled to main memory 2, and storage device 4 and 5. First OS 70 compatible with a first file system is installed in partition 51 of storage device 5 which may be a hard disk or other storage media. Partition 51 is formatted with the first file system. When booting up, computer 10 automatically loads and executes first OS 70.

Storage device 4 comprises second OS 71, bootloader 72, and installer 73 for installing second OS 71 to partition 51. Second OS 71 comprises kernel 711 and program library 712 and is compatible with a second file system different from the first file system. Kernel 711 and program library 712 may be respectively compressed into a compressed kernel file and a compressed ramdisk file. Note that in other examples compression can be skipped. Storage device 4 which may be a compact disc, a disk, or other storage media is formatted with the first file system to store second OS 71, bootloader 72, and installer 73. Installer 73 may be executed in the runtime environment of first OS 70.

For example, the first file system can be the NT File System (NTFS) of Microsoft Windows NT, and the second file system is of the Linux OS, which may include a virtual file system (vfs) supporting various file systems, such as the Second Extended File-System (ext2), NTFS, the Network File-System (nfs), the MS-DOS File Allocation Table file system (FAT), and others.

Figure 2:
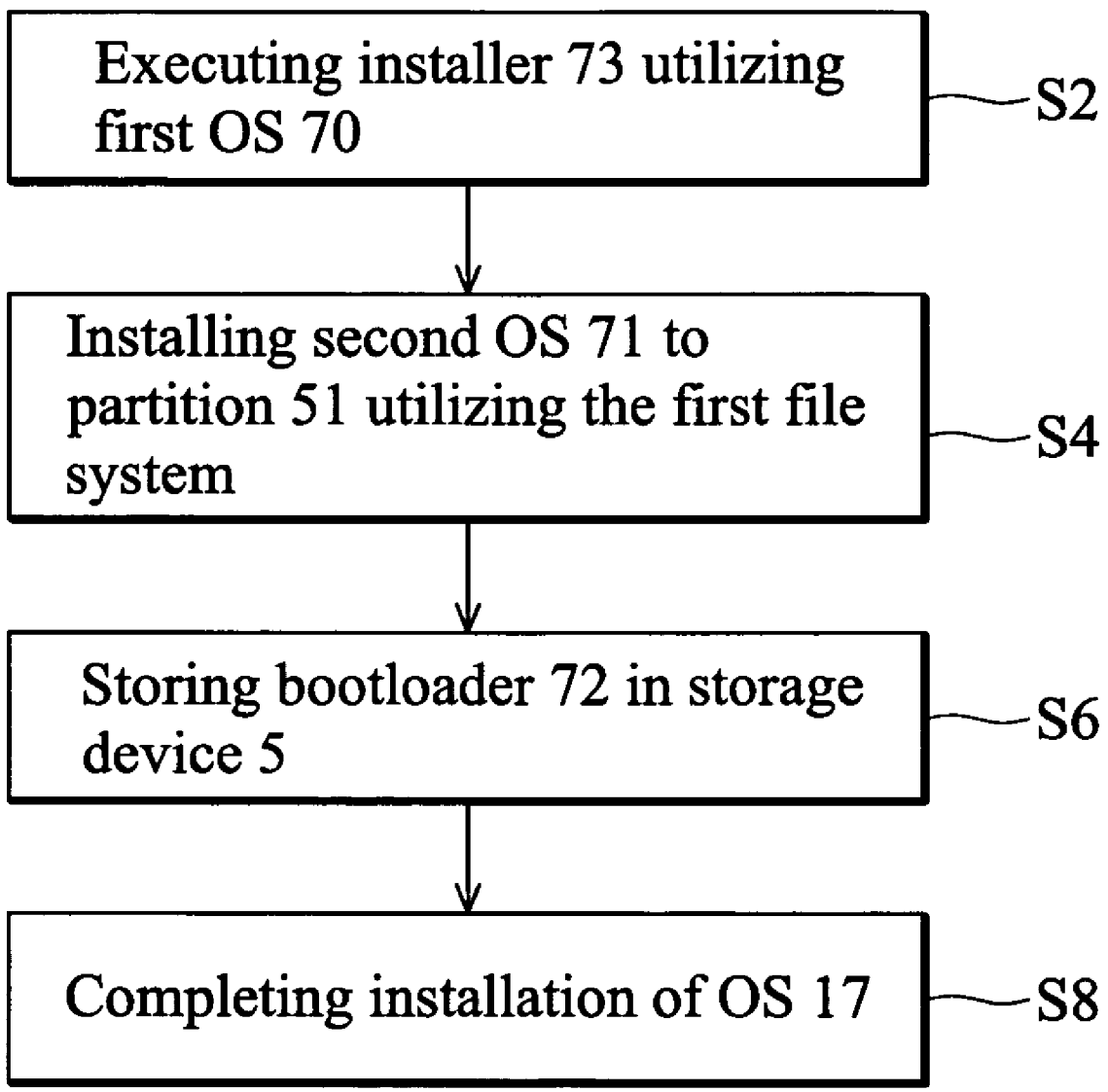
FIG. 2 is a flowchart of an exemplary installation procedure of a second operating system (OS)
Figure 3:
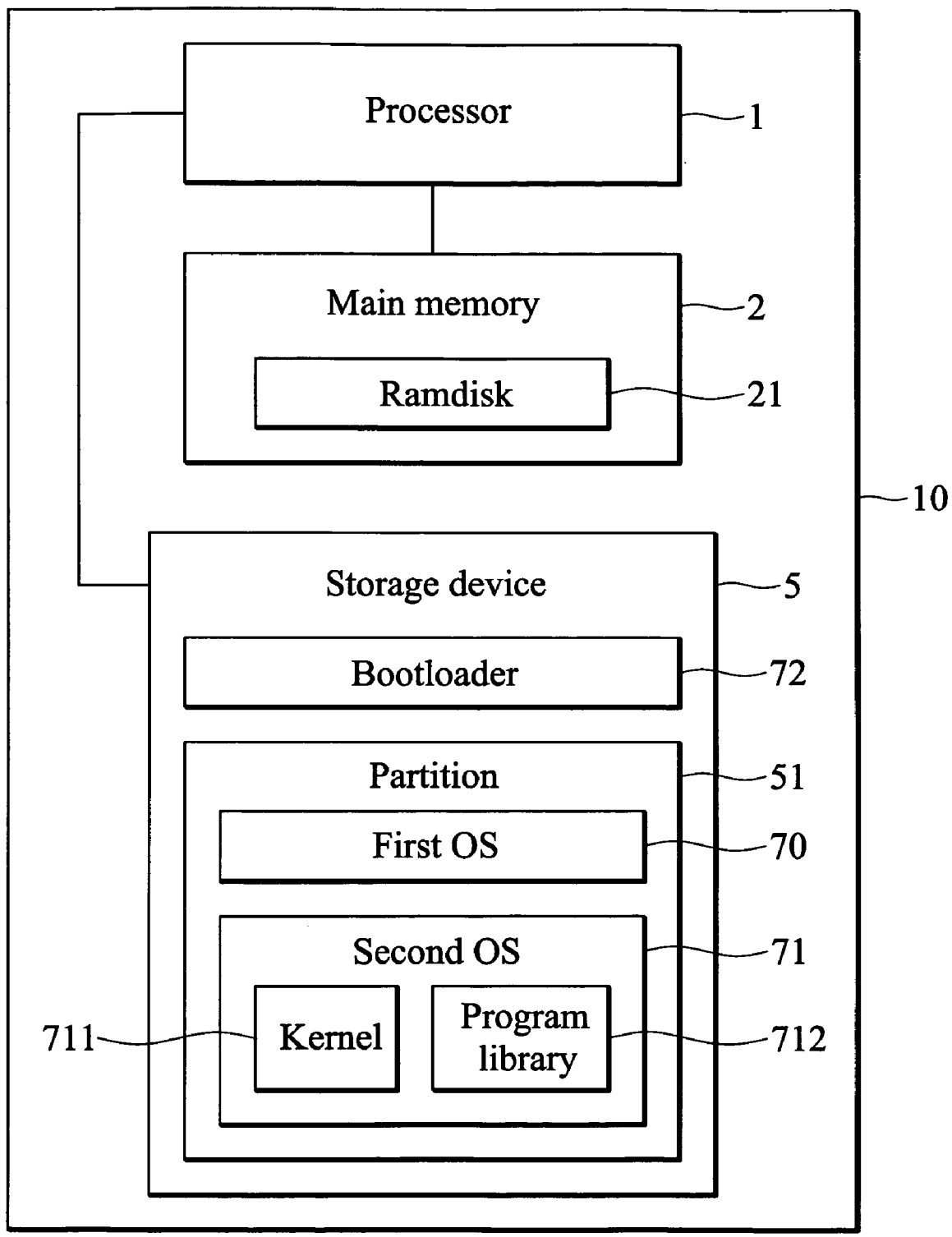
FIG. 3 is a block diagram of the computer in FIG. 1 installed with the second OS.

Installation of second OS 71 is now given with reference to FIG. 2. After computer 10 boots up with first OS 70, processor 1 executes installer 73 utilizing first OS 70 (step S2). Processor 1 installs second OS 71 to partition 51 utilizing installer 73 and the first file system, as shown in FIG. 3 (step S4). For example, processor 1 stores second OS 71 including the compressed files of kernel 711 and program library 712 to a predetermined directory of partition 51.

Processor 1 stores bootloader 72 in storage device 5 utilizing installer 73, as shown in FIG. 3 (step S6). Bootloader 72 loads kernel 711 to main memory 2 when computer 10 boots up. For example, bootloader 72 can be stored in a sector, such as the Master Boot Record (MBR), of storage device 5 as a hard disk. If an original bootloader exists, the original bootloader can be amended or replaced by bootloader 72 to ensure that kernel 711 can be selectively loaded to main memory 2 when computer 10 boots up. Thus, bootloader 72 must be able to read files in the first file system. When installation of OS 17 is complete (step S8), first OS 70 and 71 are present in partition 51 of storage device 5, as shown in FIG. 3.

Figure 4:
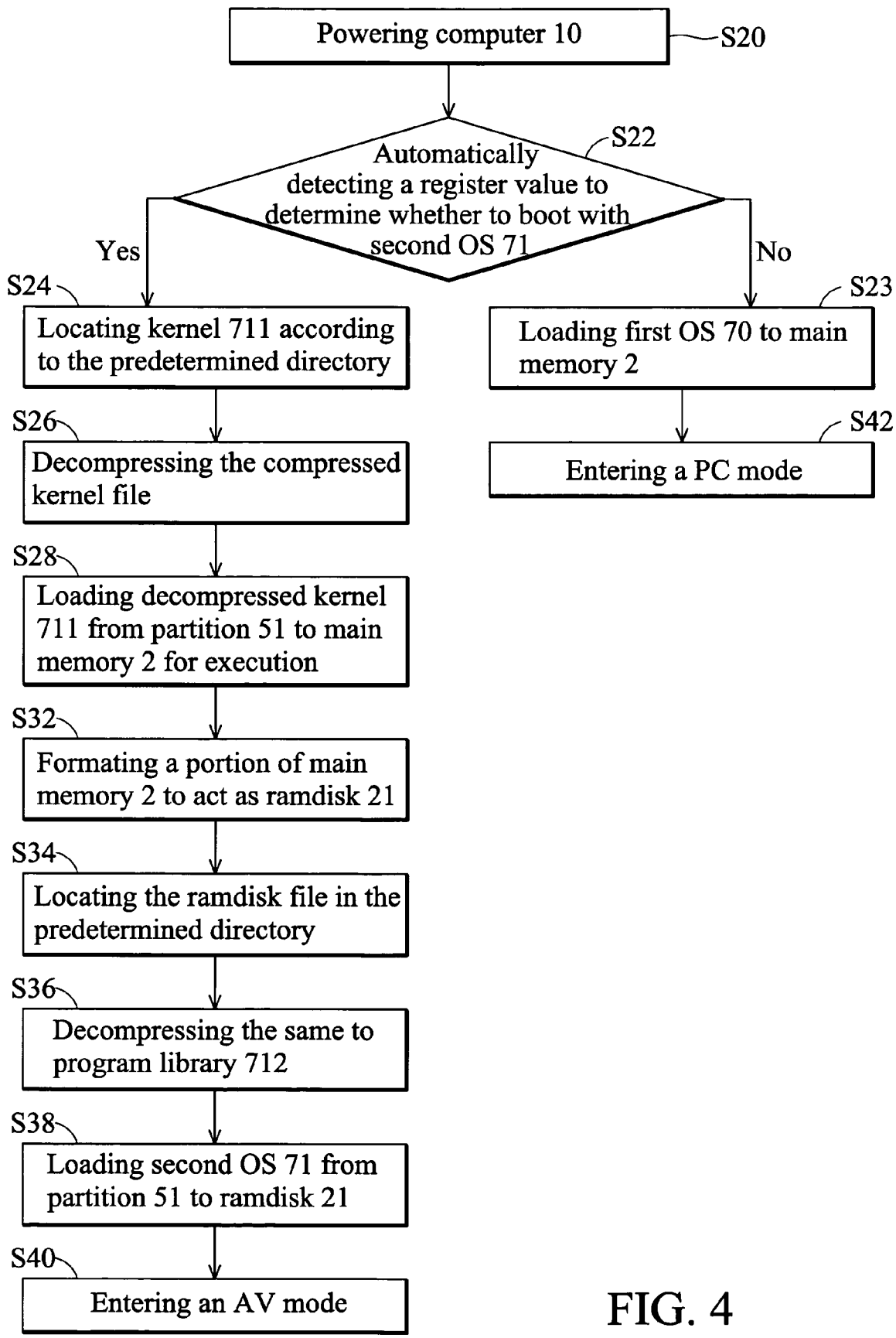
FIG. 4 is a flowchart of an exemplary boot procedure of the second OS.

An exemplary boot procedure and loading second OS 71 is given with reference to FIG. 4.

After computer 10 is powered on and performs a power on self test (POST) (step S20), processor 1 executes bootloader 72 and then automatically detects a register value to determine whether to boot with second OS 71 (step S22). For example, the register value reflects the states of a button, such as a hot key or function key of a keyboard or a remote control. Computer 10 boots up with first OS 70 or second OS 71 depending on the state of the button. When booting up with first OS 70, computer 10 loads first OS 70 to main memory 2 (step S23) and enters a PC mode to act as a normal personal computer (step S42).

When computer 10 boots up with second OS 71, bootloader 72 locates kernel 711 according to the predetermined directory (step S24). If kernel 711 has been compressed into the compressed kernel file in partition 51, the compressed kernel file is decompressed (step S26) and then loaded to main memory 2. Processor 1 loads decompressed kernel 711 from partition 51 to main memory 2 and executes kernel 711 (step S28).

Processor 1 formats a portion of main memory 2 as ramdisk 21 with the second file system according to kernel 711 (step S32). For example, according to kernel 711, processor 1 designates a directory as a mount point, establishes an instance of the second file system (such as formatting ramdisk 21 with the second file system), and mounts the second file system on the directory. For example, the first-file system is NTFS of Microsoft Windows NT, and the second file system is file system of Linux supporting various files systems. Kernel 711 supports read operations and directory creation via the first file system, initiates ramdisk 21, and formats ramdisk 21 with the ext2 file system.

Processor 1 locates the ramdisk file in the predetermined directory (step S34), decompresses the same to program library 712 according to kernel 711 (step S36), and loads second OS 71 including program library 712 from partition 51 of the first file system to ramdisk 21 of the second file system where second OS 71 can normally read, write, create, and delete files, execute applications, and utilize program library 712 (step S38). When the boot procedure with second OS 71 is complete, computer 10 executes second OS 71, for example, to entering an AV mode and serving as an information appliance (step S40).

Additionally, the boot methods can be implemented with a computer program recorded in a storage medium such as a memory or a memory device. The computer program, when loaded into a computer, directs the computer to execute the previously-described steps.

Figure 5:
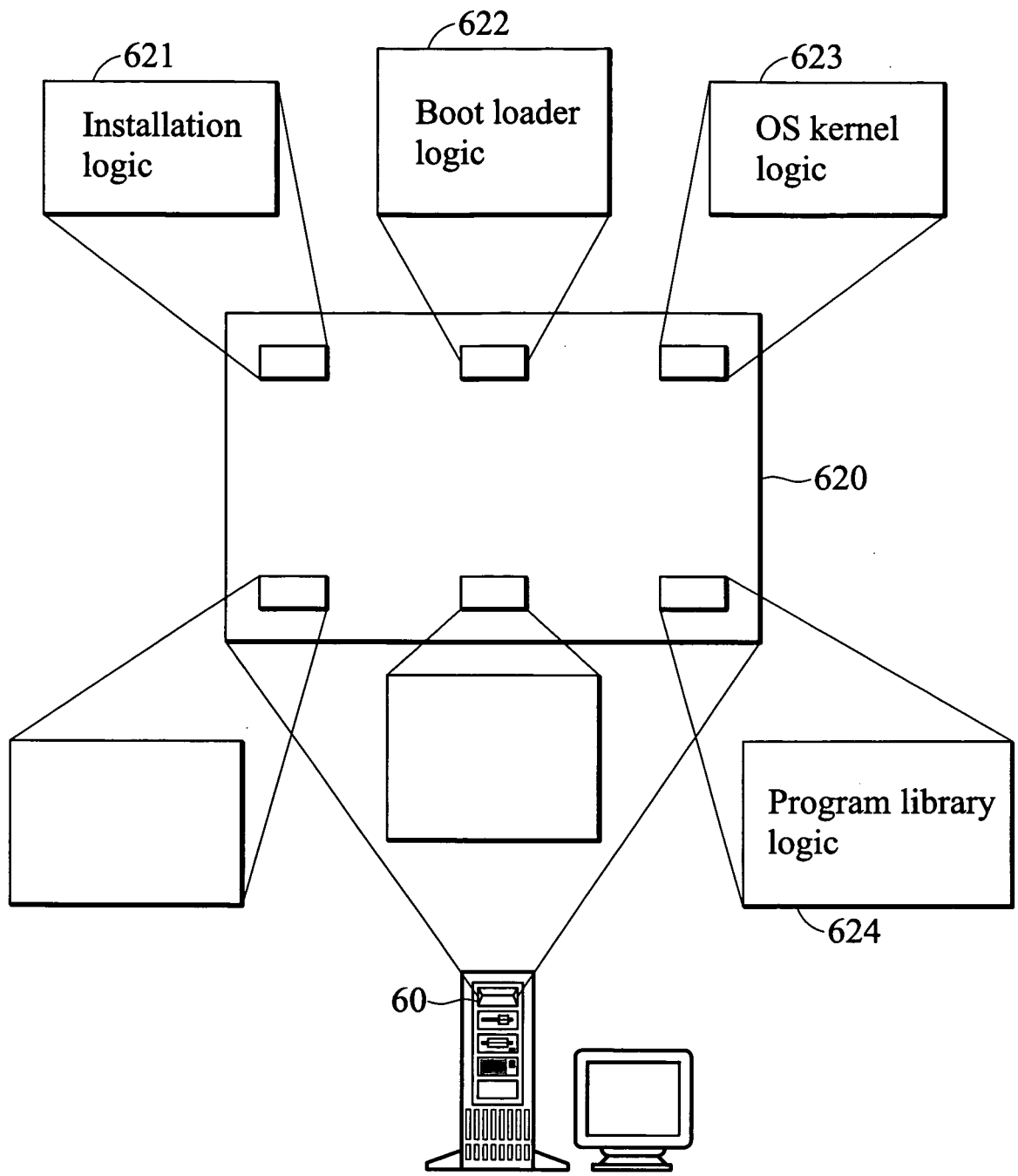
FIG. 5 is a schematic diagram of a storage medium.

In FIG. 5, storage medium 60 stores a computer program 620 for implementing a boot method. The computer program 620 comprises installation logic 621, boot loader logic 622, OS kernel logic 623, and program library logic 624.

Installation logic 621 installs boot loader logic 622 to a storage device and stores OS kernel logic 623 and program library logic 624 to a partition thereof which is formatted with a file system and installed with another OS compatible with the file system. Boot loader logic 622 loads OS kernel logic 623 to a main memory. OS kernel logic 623 creates a ramdisk by formatting a portion of the main memory with another file system and loads program library logic 624 to the ramdisk.

Second OS 71 can be loaded from partition 51 to boot up a computer by creating an instance of the second file system in ramdisk 21 in main memory. Hence, the boot methods can boot up a computer with different OSs in the same partition yet be compatible with different file systems.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A boot method, implemented in a computer comprising a main memory and a storage device having a partition, comprising the steps of:

formatting the partition with a first file system compatible with a first operating system;

installing the first operating system in the partition;

storing a second operating system in the partition, wherein the second operating system is compatible with a second file system different from the first file system;

storing a kernel corresponding to the second operating system; and when the computer boots up with the second operating system, performing the steps of:

loading the kernel from the partition to the main memory without operation of the first operating system or any other operating system;

formatting a portion of the main memory with the second file system to generate a ramdisk; and loading the second operating system from the partition to the ramdisk.

2. The method as claimed in claim 1, further comprising the step of automatically detecting a register value to decide whether to boot up with the second operating system.

3. The method as claimed in claim 1, wherein the second operating system comprises a compressed program library, further comprising the steps of:

decompressing the compressed program library to a decompressed program library; and loading the decompressed program library to the ramdisk.

4. The method as claimed in claim 1, before loading the kernel, further comprising the steps of:

after the computer boots up with the first operating system, executing an installation program of the second operating system utilizing the first operating system;

storing the second operating system on the partition conforming to the first file system according to the installation program; and storing a loader in the storage device according to the installation program, wherein the loader loads the kernel to the main memory when the computer boots up.

5. The method as claimed in claim 4, wherein the second operating system is stored in predetermined directory by which the loader retrieves the second operating system.

6. A computer, comprising:

a main memory;

a storage device, a partition of which comprises a first operating system and a second operating system, wherein the partition is formatted with a first file system compatible with the first operating system, and the second operating system is compatible with a second file system different from the first file system and comprises a kernel;

processor to a coupled the main memory and the storage device; and a loader also stored in the storage device, wherein the loader and kernel are executable by the processor, and wherein the loader is configured to load the kernel from the partition to the main memory without operation of the first operating system or any other operating system when the computer boots up with the second operating system, and the kernel is configured to format a portion of the main memory with the second file system to generate a ramdisk, and load the second operating system from the partition to the ramdisk.

7. The computer as claimed in claim 6, wherein the loader is configured to automatically detect a register value to decide whether to boot up with the second operating system.

8. The computer as claimed in claim 6, wherein the second operating system comprises a compressed program library, and the kernel is configured to decompress the compressed program library to a decompressed program library and load the decompressed program library to the ramdisk.

9. The computer as claimed in claim 6, wherein the second operating system is stored in a predetermined directory by which the loader retrieves the second operating system.

* * * * *